United States Patent [19]

Kishino et al.

[11] Patent Number: 4,769,648
[45] Date of Patent: Sep. 6, 1988

[54] DOT-PRINTING DEVICE WITH INDEPENDENTLY OPERATED DATA-PROCESSING UNITS

[75] Inventors: Yasuichi Kishino, Mishima; Naoki Miyazaki, Shizuoka; Kazuhiko Hiramatsu, Susono; Yasufumi Ichikawa, Mishima, all of Japan

[73] Assignee: Tokyo Electric Co., Ltd., Tokyo, Japan

[21] Appl. No.: 941,405

[22] Filed: Dec. 15, 1986

[30] Foreign Application Priority Data

Dec. 24, 1985 [JP] Japan .................................. 60-291728

[51] Int. Cl.$^4$ ........................ G01D 5/00; G01D 15/16
[52] U.S. Cl. .............................. 346/33 R; 346/140 R; 400/126; 364/519
[58] Field of Search ...................... 346/140, 75, 33 R; 400/126, 124, 121; 364/519

[56] References Cited

U.S. PATENT DOCUMENTS

| | | |
|---|---|---|
| 4,273,041 | 6/1981 | Bolcavage . |
| 4,279,199 | 7/1981 | Blanco ............................ 400/124 X |
| 4,364,060 | 12/1982 | Jinnai ..................................... 346/75 |
| 4,485,386 | 11/1984 | Dagna ..................................... 346/75 |
| 4,567,570 | 1/1986 | Peer ................................ 364/519 X |
| 4,603,338 | 7/1986 | Nakayama ........................... 346/140 |

Primary Examiner—Joseph W. Hartary
Attorney, Agent, or Firm—Frishauf, Holtz, Goodman & Woodward

[57] ABSTRACT

A dot printer comprises a printing head, a memory, a first MPU for storing the dot-image data, corresponding to the input printing data, in the memory, and a second MPU for reading out the dot-image data from the memory, and supplying this data to the printing head, and for driving the printing head so as to effect a printing operation on the basis of the readout dot-image data. The dot printer additionally has first and second buffers, and its memory is connected to the first and second MPUs, via the first and second buffers, respectively.

6 Claims, 8 Drawing Sheets

F I G. 3
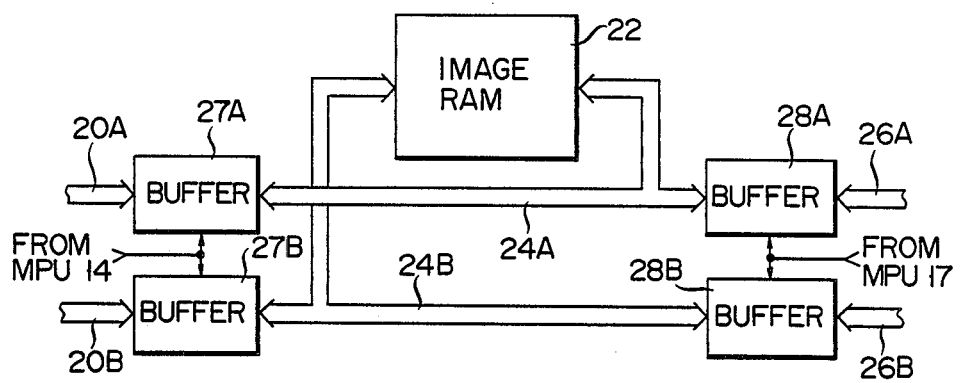
F I G. 4
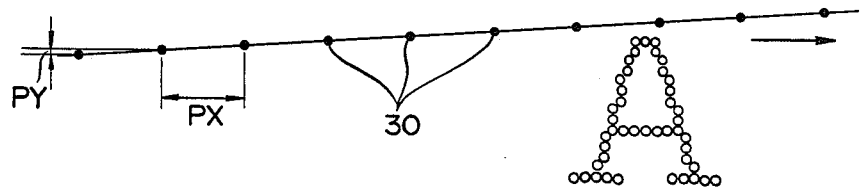
F I G. 5
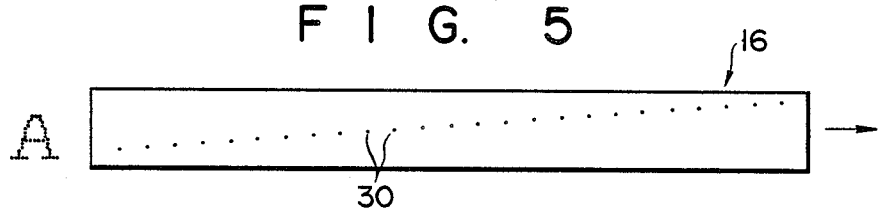
F I G. 6
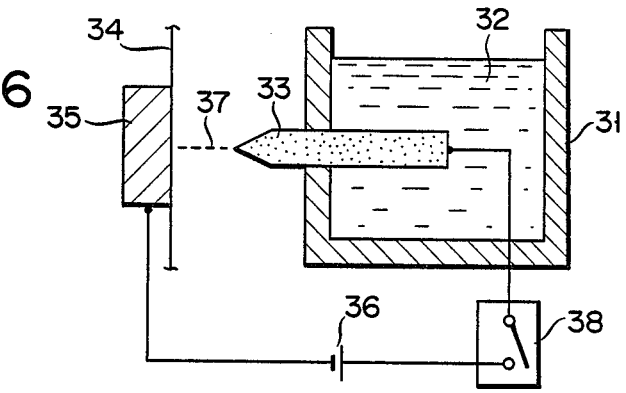

DOT-PRINTING DEVICE WITH INDEPENDENTLY OPERATED DATA-PROCESSING UNITS

BACKGROUND OF THE INVENTION

The present invention relates to a dot matrix printer, such as an ink jet printer or the like.

In general, dot matrix printers are widely used to print output data from computers and the like. In recent years, high-density, high quality printing, using multipins, has been required, and near-letter-quality printing has been achieved with the dot matrix system.

On the other hand, the amount of data to be processed has steadily increased, and thus a high data-processing speed has also come to be required of such a printer.

FIG. 1 shows a control circuit of a conventional dot matrix printer, used to accomplish such high-speed and high-density printing.

First, a first microprocessor unit (MPU) 1 is connected to a host computer via an interface 2. MPU 1 receives and edits the data from the host computer, and performs the main control functions, such as interpreting of commands, referring to the contents of a character generator, the producing of a printing-dot image, and the like. A ROM 3 which stores drive programs to be executed by MPU 1, and which includes a character generator, is connected to MPU 1 via an internal bus 4. A RAM 5 which is used as a reception data buffer, a printing-dot image buffer, and the like, is also connected to MPU 1, via internal bus 4. A second microprocessor unit (MPU) 6, is connected to a printing head 8, via a head driver 7, to control the sending of data to printing head 8, the timing for writing the data, on the basis of timing data supplied by a timer 9, and the operation of carrier motor 10 and feed motor 11. MPU 6 is a one-chip microcomputer having a program ROM and a RAM on the same chip. A command to specify the operating mode, the printing data and the like are sent from MPU 1 to MPU 6, via an I/O port 12. Timer 9 designates the printing-dot timing and the operation timing for carrier motor 10 and the like, and generates an interruption signal to MPU 6.

In the prior art printer described above, the data-receiving and editing processes, printing head control, and carriage control are respectively executed by individual microprocessor units MPU 1 and MPU 6, so that the processes can be performed at a high speed. MPU 6 supplies the data to printing head 8, on a one-column unit basis. The data is printed by printing head 8, while the carrier is moved synchronously with the printing operation, and MPU 1 receives the next data to be printed.

In the foregoing conventional control system, the data is transmitted and received via I/O port 12. Thus, MPU 1 extracts the printing data from RAM 5, by an amount of only one byte, sets it into I/O port 12, and sends an interrupt signal, indicating that the data has been set therein, along a status line SL to MPU 6. After MPU 6 receives this signal, it reads the data set into I/O port 12, and then outputs the data to printing head 8, at the timing designated by timer 9. Thereafter, MPU 6 sends an interrupt signal, requesting the next data from MPU 1, along the status line.

As has been mentioned above, data has to be transmitted and received on a one-byte unit basis, between MPUs 1 and 6, and the data-transmitting and receiving operations should therefore be under strict timing control. Consequently, a considerable period of time is required for the transmission and reception of the data, and this constitutes a major obstacle to the aim of processing the data at high speed.

SUMMARY OF THE INVENTION

It is an object of the present invention to provide a dot-printing device which can achieve a high data-processing speed, by reducing the time required to transfer data between first and second data-processing units.

This object is accomplished by a dot-printing device comprising: a printing head; an image memory; a first data-processing unit for storing dot-image data, corresponding to input printing data, into the image memory; a second data-processing unit, for reading out the dot-image data from the image memory, for supplying the dot-image data to the printing head, and for driving the printing head to perform printing based on the readout dot image data; and a common external bus for connecting the first and second data-processing units to the image memory, via first and second buffers, respectively.

According to the present invention, the common external bus is connected to the first and second data-processing units via the first and second buffers. Therefore, the first and second data-processing units execute data processing by independently using the respective internal buses at the times other than when the common external bus is being accessed. In other words, even when one of the first and second data-processing units is accessing the common external bus, the other data-processing unit can independently execute other data processing. Thus, precise synchronization is not required for the respective operations being performed by the first and second data-processing units, so that data transmission and reception can be processed in parallel, and the time required for data transmission and reception can accordingly be reduced.

BRIEF DESCRIPTION OF THE DRAWINGS

FIG. 3 shows the connecting relation between an external bus which is used for the dot-printing device shown in FIG. 2 and internal buses which are used for first and second data-processing units;

FIGS. 4 and 5 show positional relations between character "A" to be printed and heating elements of a printing head;

FIG. 6 shows one of the heating elements which constitute the printing head;

DETAILED DESCRIPTION OF THE PREFERRED EMBODIMENTS

Figure 1:
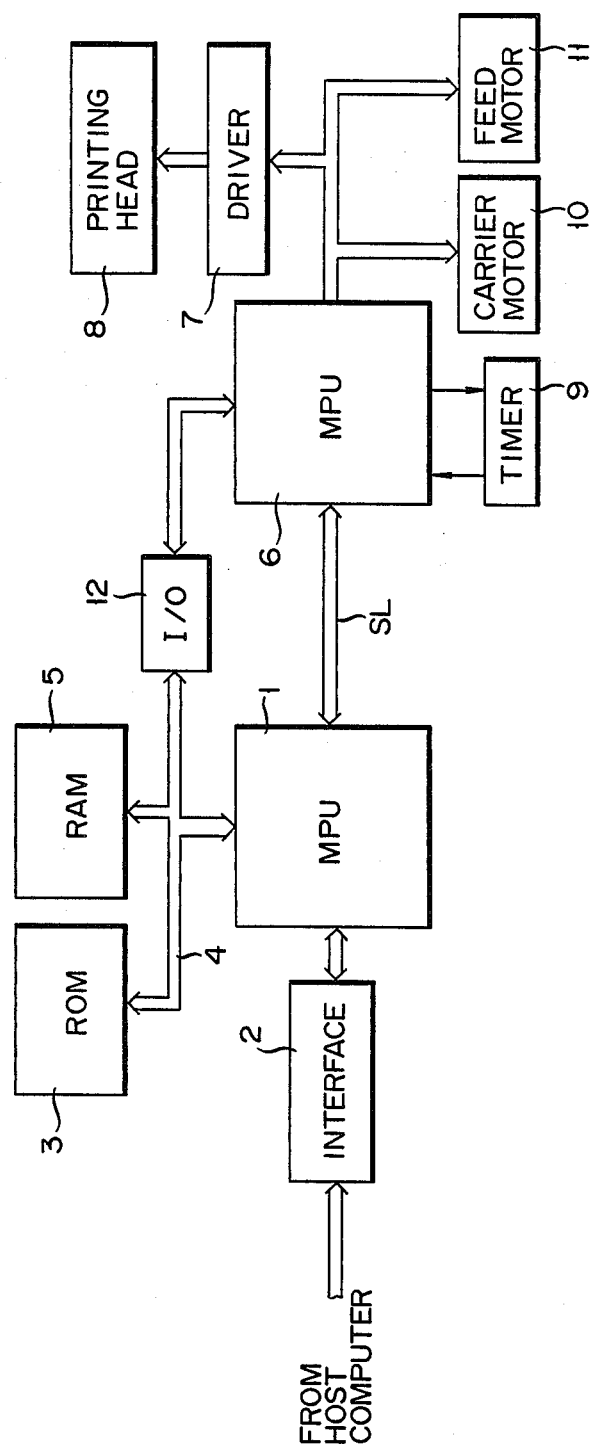
FIG. 1 is a block diagram of a conventional dot-printing device.

A dot-printing device according to a first embodiment of the invention will now be described, with reference to FIGS. 2 to 7B.

The dot-printing device comprises a first microprocessor unit (MPU) 14 connected to a host computer via an interface 13; and a second MPU, denoted by numeral 17, connected to a printing head 16 via a head driver 15. MPU 14 is the main CPU for performing the principal mechanism control functions, including reception and editing of data. A ROM 18 in which programs to be executed by MPU 14 are stored, and a RAM 19 having a work area are connected to MPU 14 via an internal bus 20. A carrier motor 21 is also connected to MPU 14. In contrast, MPU 17 is a slave CPU used mainly for the transmission of data to printing head 16 and the control of the driving time for the printing head. MPU 17 is constituted as a one-chip microcomputer having a ROM and a RAM therein.

Further, an image RAM 22 for storing the printing-dot image data produced by MPU 14 is commonly provided for MPUs 14 and 17. Image RAM 22 has two memory areas for storing the dot-image data of, for example, one line. MPUs 14 and 17 are mutually connected by a command status line 23, and are also connected to image RAM 22 by a common external bus 24.

As is shown in detail in FIG. 3, common external bus 24 includes address bus 24A and data bus 24B. Buses 24A and 24B are connected to internal address buses 20A and 26A and internal data buses 20B and 26B of MPUs 14 and 17, via 3-state buffers 27A, 28A, 27B, and 28B, respectively. Thus, image RAM 22 can be accessed by either of MPUs 14 and 17. In this example, 3-state buffers 27A and 27B are controlled by MPU 14 and 3-state buffers 28A and 28B are controlled by MPU 17.

Figure 7A:
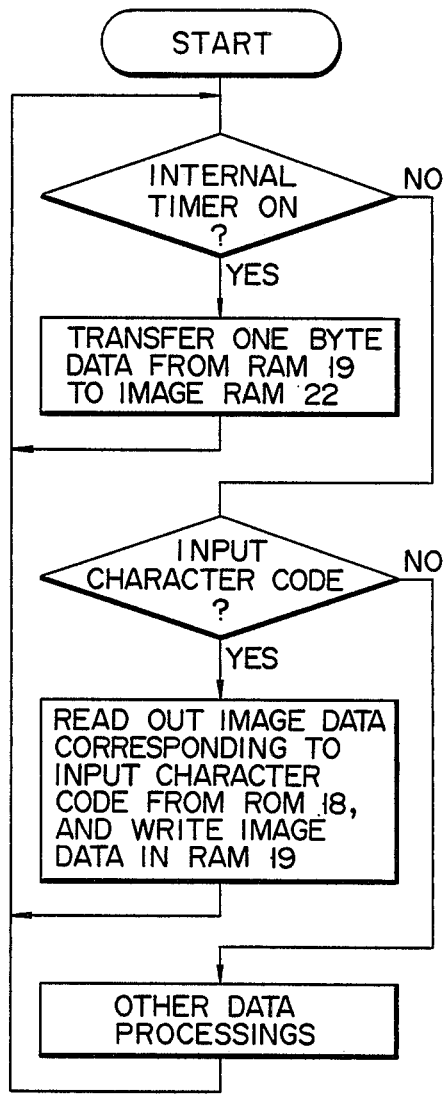
FIGS. 7A and 7B are flowcharts showing the writing and reading operations into and from an image RAM in the dot-printing device shown in FIG. 2.

In the foregoing construction, when MPU 14 receives data from a host computer, it edits the data and then writes one line of this edited data into image RAM 22, via buffer 27 and common external bus 24. For example, as is shown in FIG. 7A, MPU 14 reads out the image data corresponding to the input character code, from the host computer from ROM 18, and writes it into an available memory area in image RAM 22. Thereafter, MPU 14 generates a command to start the printing process. In this case, all the information relevant to the printing process, such as printing mode, the head address for the image data stored in image RAM 22, the number of printing dots of one character line, and the like, is transmitted, in advance, from MPU 14 to MPU 17 via command status line 23. MPU 17 reads the relevant storage addresses, followed by the dot-image data to be printed, from image RAM 22, via common external bus 24 and 3-state buffers 28A and 28B, for a predetermined period of time. Then, MPU 17 drives printing head 16, on the basis of the readout image data. During this predetermined period of time, MPU 14 continues receiving and editing the data output from the host computer, and stores the succeeding printing dot-image data in the remaining available area in image RAM 22, when the predetermined period of access time has expired, and MPU 17 has interrupted access to image RAM 22. MPU 14 performs this timing control based on the timing data supplied by a timer included in MPU 14.

In this manner, according to this embodiment, MPU 17 directly reads out the data written into image RAM 22 by MPU 14, and at the same time, MPUs 14 and 17 can each operate independently, and do not simultaneously access image RAM 22. Therefore, highly accurate synchronization and interrupt operations are not required for both MPU 14 and MPU 17. Thus, data can be processed and printed at high speed, by a printing device with a simple construction.

In this embodiment, feed motor 29, for feeding printing paper, is also connected to and is driven by MPU 17. According to the foregoing construction, when the printing device is in the printing mode, the main function of MPU 17 is the control of the printing operation. MPU 17 waits for a command from MPU 14 when the printing device is in an operating mode other than the printing mode. By allowing MPU 17 to control feed motor 29 during this waiting time, MPU 14 can be used exclusively for receiving and editing the data, with the result that the throughput of the printer can be improved. In the ordinary printer, the printing operation and the paper-feeding operation are not executed simultaneously. Therefore, even when the foregoing control process is used, paper-feed control process can be executed without adversely affecting the high-speed printing process.

Figure 7B:
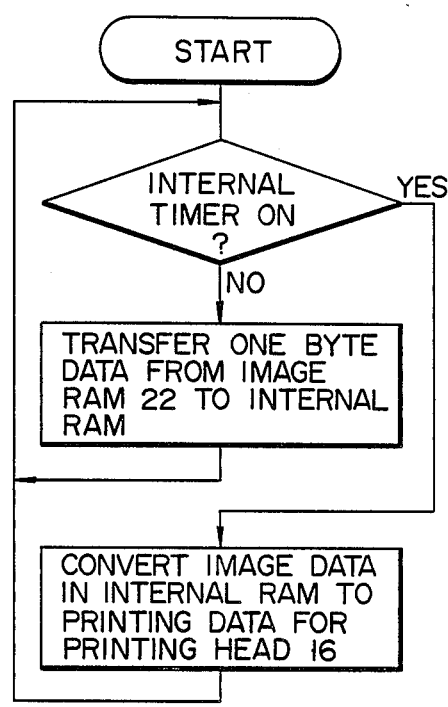
Figure 8:
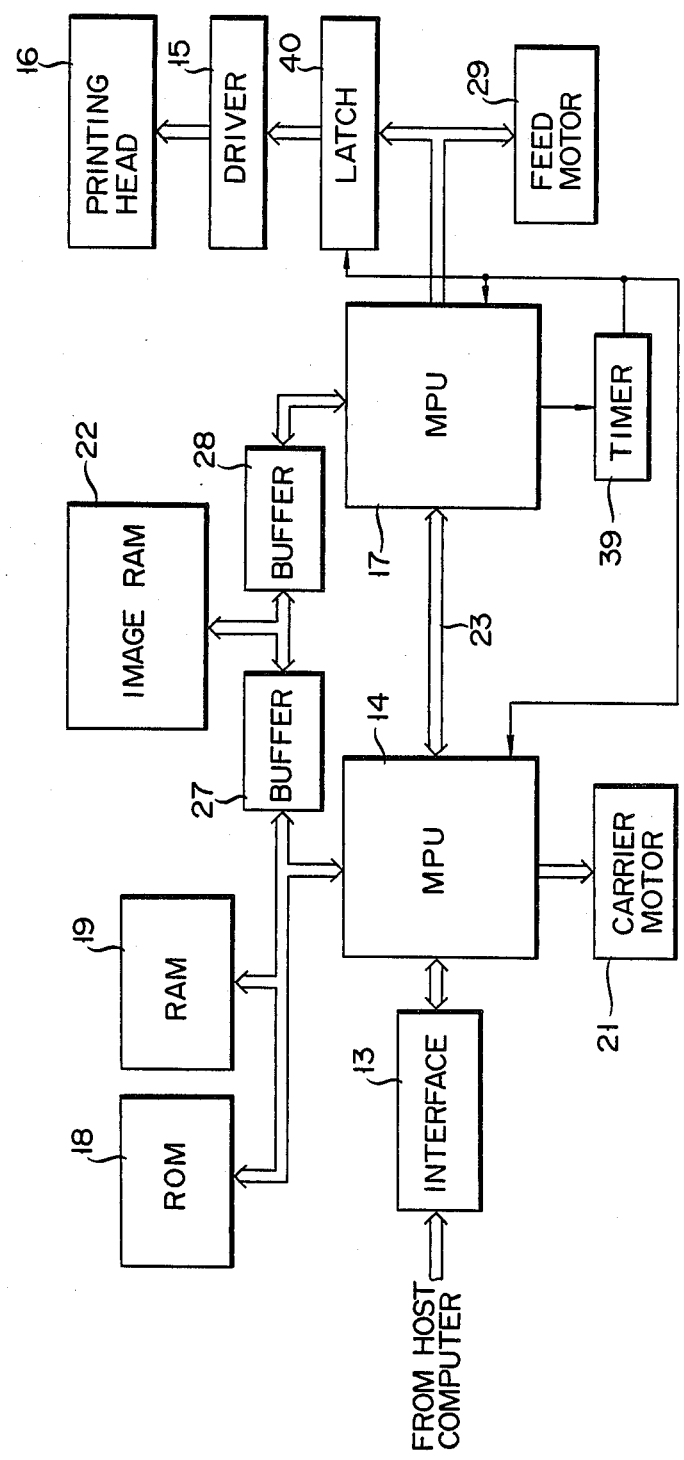
FIG. 8 is a block diagram of a dot-printing device according to another embodiment of the present invention.

According to this embodiment, printing head 16 comprises, for example, twenty-four head elements which are obliquely arranged with respect to the advancing direction thereof, as is shown in FIGS. 4 and 5. FIG. 4 shows a letter "A", as an example of a printing character, and a dot arrangement thereof. In practice, the dot pitch PY of head elements 30, is set to 1/180 inch (=0.141 mm), in the direction perpendicular to the advancing direction of head 16. The element pitch PX, is set to, for example, 1/10 inch (=2.54 mm), in the advancing direction of head 16. To print data, using printing head 16, as is shown in the flowchart of FIG. 7B, MPU 17 sequentially reads out the data from image RAM 22, and selectively extracts data from each data column, one bit at a time, thereby producing the printing data for each head element 30. In other words, MPU 17 extracts one-bit data for the first element, from the first address position of the i-th column in image RAM 22, and then the one-bit data for the second element, from the second address position of the (i+1)th column. As has been mentioned above, in the case of a printing head 16 comprised of 24 elements, the abovementioned operations are repeated twenty-four times, thereby obtaining the printing data of twenty-four bits for use in the printing cycle. To derive the 24-bit printing data for use in the succeeding printing cycle, the readout of the data is initiated from the first address position of the (i+1)th column. If the foregoing 24-bit data-extracting operation is executed by an ordinary microcomputer, assuming that one instruction cycle is 500 nsec, a time of approximately 100 $\mu$sec will be necessary for this extraction operation, even if an 8-bit microcomputer is used. In general, when using a high-speed printer, one dot should ideally be printed every 200 $\mu$sec or less. Therefore, the data-processing method of this embodiment, in which the data is transmitted from MPU 14 to MPU 17 via image RAM 22 arranged on common external bus 24, is suitable for attaining a high-speed printing operation. As has been described above, since MPU 17 executes the operation for transmitting the dot-image data to printing head 16, even if a printing head 16 having obliquely arranged printing elements is used, the high-speed printer of this invention can be realized.

Such an oblique arrangement of the printing elements 30 of printing head 16 may be used in the case of a printing head structure of an electrostatically flying type ink jet system, as is shown in, for example, FIG. 6. According to this printing head structure, a high voltage of about 3.5 kV is applied, by a DC power source 36, between a porous conductive electrode stylus 33, which is impregnated with an ink 32 in a tank 31, and an opposed electrode 35 which faces electrode stylus 33, across a gap, with a sheet of printing paper 34 arranged therebetween. An ink flow 37 is emitted across this gap by the electrostatic force. The emitting and the stopping of ink flow 37 are performed by controlling the supply of a high voltage, by means of a high-voltage switch 38 which is constituted by a transistor having a high withstand voltage, or the like. In such an ink jet printer, since electrode stylus 33 is made of a porous material having a large aperture ratio, such as a braided stick of polyester fibers or the like, the diameter of electrode stylus 33 may be as large as 1 mm, and an electric field of a high potential gradient is formed. Therefore, if the distance between the respective elements is too small, the electric field will be adversely affected, so that printing cannot be performed accurately. For these reasons, the distance between electrode styli 33 (elements) needs to be at least 2 mm; consequently, the elements cannot be arranged in a high density. To obtain a high-density arrangement, it is necessary, for example, to obliquely arrange the elements as is shown in FIG. 5. However, in the case of the foregoing type of ink-jet printing head 16 system, the response speed is so high that the printing head can respond to a high-speed pulse of 5 kHz or higher. Therefore, printing head 16 is suitable for the high-speed printing operation.

Further, in this embodiment, since carrier motor 21 is driven under the control of MPU 14, it is possible to drive printing head 16 while carrier motor 21 is being driven.

A second embodiment of the present invention will now be described, with reference to FIGS. 8 and 9A to 9D. In this embodiment, a timer 39 which is driven by MPU 17, and which generates a dot-print timing signal, is provided. The print timing of printing head 16 is controlled by the output of timer 39, via a latch 40. The dot-print timing signal from timer 39 is also input to MPUs 14 and 17. The operation of writing the data into image RAM 22, by MPU 14, must be executed during a period of time other than when data-reading is being performed by MPU 17. Therefore, one dot-printing time period is divided into two shorter periods by the output of timer 39, such that accessing operations being performed by MPUs 14 and 17, in relation to image RAM 22, don't overlap. Thus, the time period allocated for data-writing and that for data-reading are controlled on a time-share basis.

Figure 9:
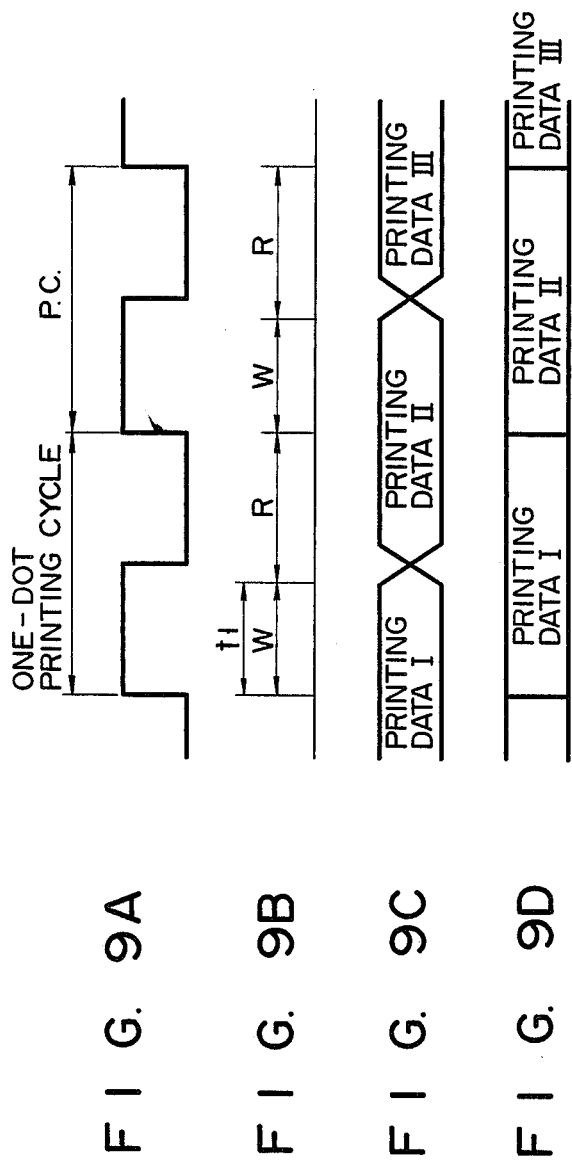
FIGS. 9A to 9D are timing charts for explaining the operation of the dot-printing device shown in FIG. 8.

FIGS. 9A to 9D show timing charts for explaining such timing control. First, the output (shown in FIG. 9A) from timer 39 is used as a latch pulse to be supplied to latch 40. The data is latched, in latch 40, in response to the leading edge of the latch pulse. After the elapse of a set time, the next data is latched. Timer 39 is of the automatic reloading type. Once this timer has been set and made operative, it functions as a timing-pulse generator which continuously outputs a square wave signal, as is shown in FIG. 9A, until the software stops the pulse-generating function. The period of this timing pulse is equal to the one-dot printing cycle. In this embodiment, the output of such a timer 39 is supplied, as the interruption signal, to MPUs 14 and 17, thereby controlling these MPUs such that their accessing operations, in relation to image RAM 22, don't overlap. The interval t1 after this interruption, as is shown in FIG. 9B, is set as writing time period W, which is the period of time during which MPU 14 can access image RAM 22, to perform data write-in. The interval after completion of this write-in permission period W, until the next interruption is performed, is set as the period during which MPU 17 can access image RAM 22, i.e., readout permission period R. The setting order of periods W and R may be reversed, if desired. MPU 17 reads out the printing data from image RAM 22 after the elapse of a time which is slightly longer than time t1, and supplies the data to latch circuit 40, as is shown in FIG. 9C. In response to the leading edge of the output pulse from timer 39, latch circuit 40 extracts the printing data from MPU 17, and holds it for a period of time which is almost equal to the one-dot printing cycle, as shown in FIG. 9D. In this manner, by time-sharingly controlling the one-dot printing cycle synchronously with the output of timer 39, the next printing data can be prepared while the current data is being printed. Consequently, the throughput of the printer can be improved.

Figure 10:
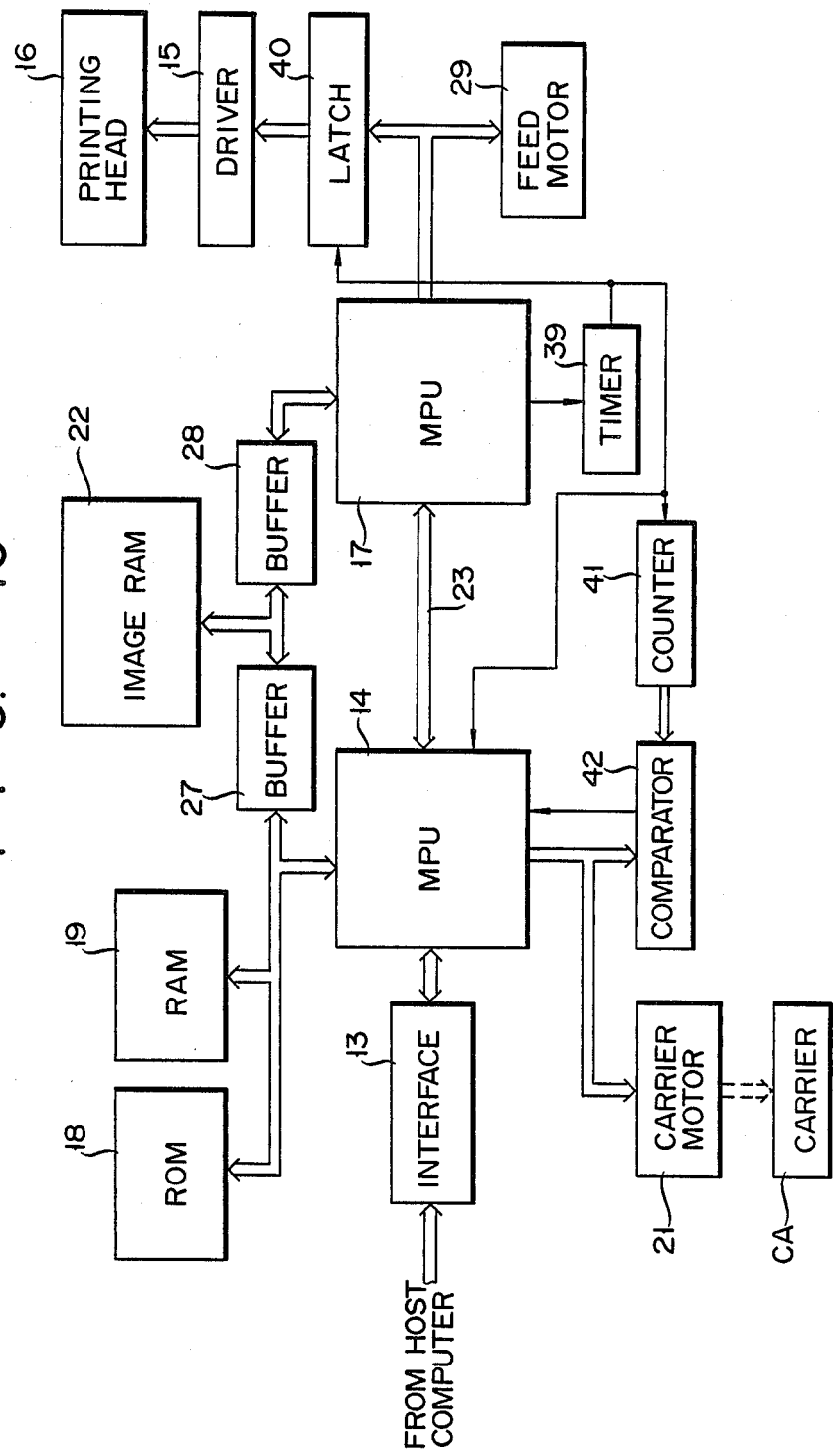
FIGS. 10 and 11 are block diagrams of dot-printing devices according to still other embodiments of the present invention, respectively.

A third embodiment of the present invention will now be explained, with reference to FIG. 10. In this embodiment, timer 39 is also provided similarly to the second embodiment. However, the third embodiment is additionally provided with a counter 41 for counting the number of output signals generated by timer 39, and a comparator 42 for comparing the count value of counter 41, with a predetermined value, and for inputting to MPU 14, a signal indicating that the count value has reached a predetermined value.

Referring to FIG. 9A, the output of timer 39, in this case, is the printing dot clock signal, and the number of output pulses corresponds to the number of dots printed in the printing direction. Therefore, MPU 14 presets a predetermined value, corresponding to the total number of dots to be printed in one line, into a comparator 42, on the basis of the printing data which will be printed subsequently. The number of times the output signal is generated by timer 39, is counted by counter 41, from the beginning of the character line being printed. The count value is compared by comparator 42. As a result, MPU 14 can automatically detect when the printing of one line has been completed, by receiving a coincidence signal from comparator 42 as, for example, an interruption signal, without having to monitor the printing time. Consequently, MPU 14 can be used exclusively for executing such processes as data reception, until the coincidence signal is generated from comparator 42. After the coincidence signal has been generated, and the data of one complete line has been printed, MPU 14 stops the receiving and editing operations, whereby it can then execute such processes as the stopping of carrier motor 21, the writing of the next dot data into the memory area, in image RAM 22, which was used during a former cycle, and so forth.

Figure 11:
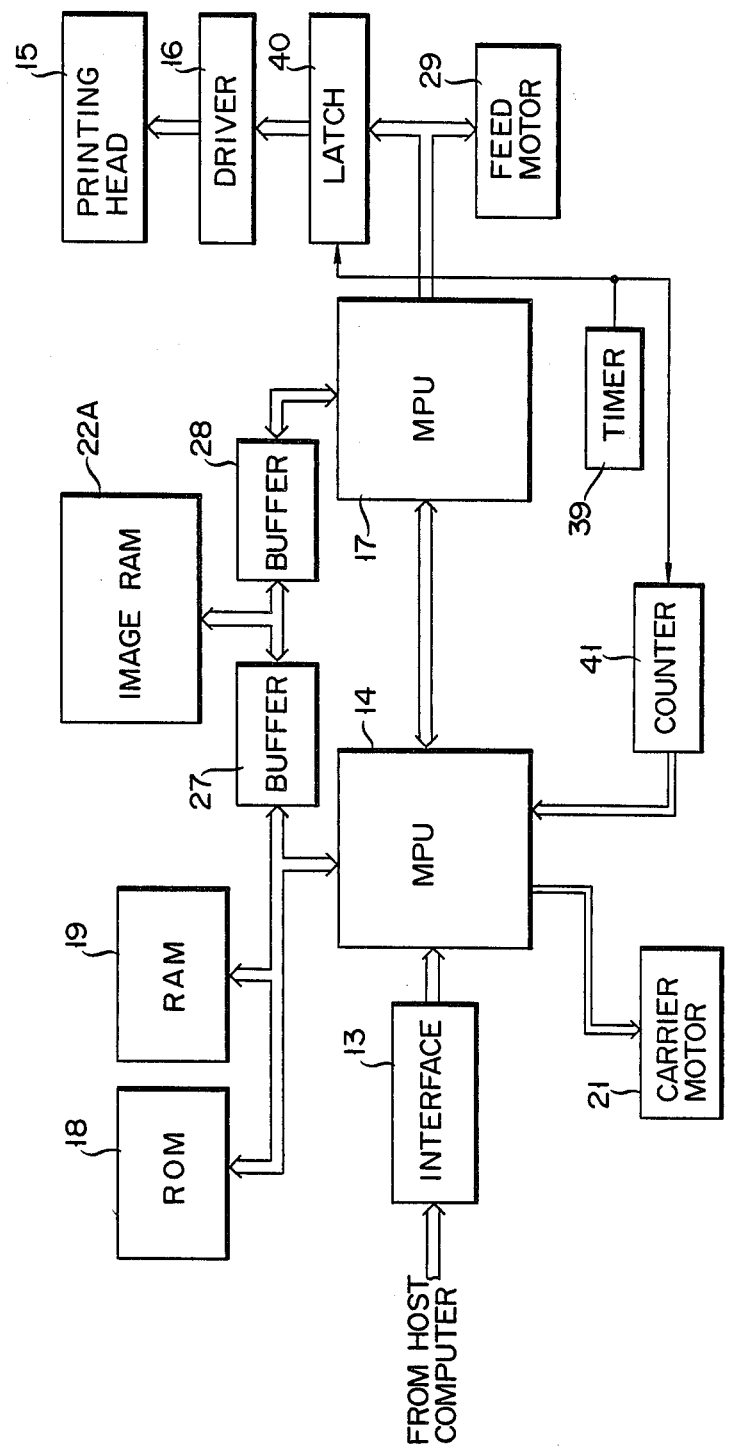

A fourth embodiment of the present invention will now be described, with reference to FIG. 11. In this embodiment, the number of times the output signal is generated by timer 39 is also counted by counter 41, similarly to the third embodiment. However, in the fourth embodiment, the count value of counter 41 is input directly into MPU 14, and is processed as the value corresponding to the pointer indicative of the available area in image RAM 22. That is, unlike image RAM 22 shown in FIG. 2, an image RAM 22A in this embodiment stores only the dot-image data of almost one line. MPU 14 writes the new dot data into the area now available, following the readout, by MPU 17, of the previous dot data stored in RAM 22A.

When considering the improvements to the processing speed of the printer, if the printing speed is increased, then the stopping time of the carriage needs to be minimized. Therefore, if the storing of the data of the next one line in image RAM 22A is started after the data of the preceding one line has been printed, the carriage must be stopped for this interval. In this case, dot-image data, stored in an area of image RAM 22A, having been printed, then becomes unnecessary. Therefore, the new data can be written into this newly available area, in preparation for the next printing cycle. By checking the address of a memory area in image RAM 22A, in which the data currently being printed is stored, the amount of memory area available in image RAM 22A can be immediately known. In particular, in the image RAM 22A of this embodiment, it is sufficient to use a dot image buffer having a capacity substantially equal to the printing data of one character line. Therefore, in this embodiment, by means of counter 41 counting the number of output signals generated by timer 39, the count value of counter 41 is input to MPU 14 such that MPU 14 can detect the number of dots of the character line which is currently being printed. MPU 14 can easily find out the amount of available data-storage area in image RAM 22, from the start address in image RAM 22A and from the output of counter 41. Even during the printing operation, the next printing data can be sequentially written into the available area in image RAM 22A, and the throughput of the printer can thus be improved.

Although the present invention has been described above with respect to several embodiments, the invention is not limited to only these embodiments.

Figure 2:
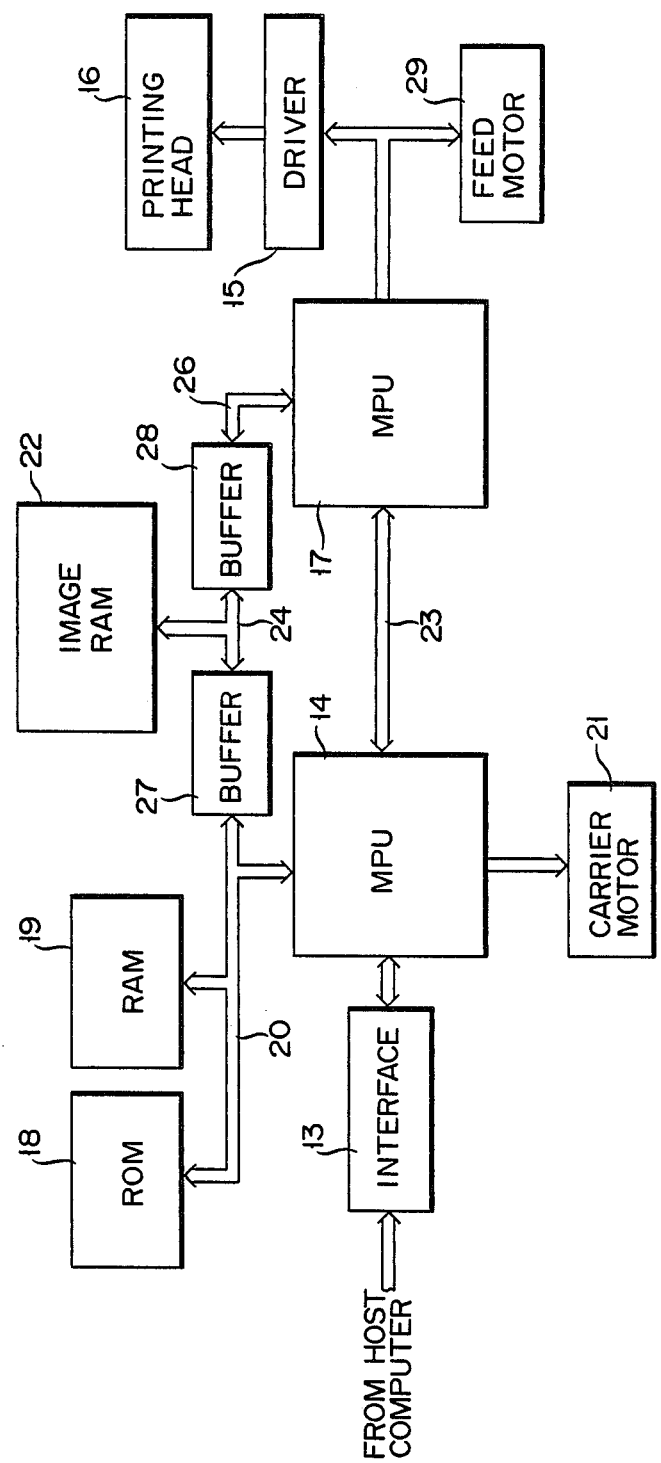
FIG. 2 is a block diagram of a dot-printing device according to an embodiment of the present invention.

For example, in the embodiment shown in FIG. 2, information such as the printing mode, the reading start address in image RAM 22, number of printing dots of one line, and the like is transmitted to MPU 17 via multi-bit command status line 23. However, in this case, a one-bit control line may be used in place of multi-bit command status line 23. In the case of transferring the printing data, MPU 14 stores the command information in the predetermined address in image RAM 22, and thereafter supplies an attention signal to MPU 17 via a one-bit control line. MPU 17 then reads out the command information therefrom, and in accordance with this information, reads out the printing data from image RAM 22.

In the foregoing embodiments, timer 39, counter 41, and the like can be arranged in MPU 14 or 17.

Furthermore, it is also possible to constitute each of MPUs 14 and 17 so that they can read and write data from and into image RAM 22 or 22A.

What is claimed is:

1. A dot-printing device, comprising:
  a printing head;
  image memory means for holding dot-image data corresponding to printing data which is to be printed in dot form by said printing head;
  first data-processing means for storing the dot-image data, corresponding to input printing data, in said image memory means;
  second data-processing means for reading out the dot-image data from said image memory means, and supplying said dot-image data to said printing head, and for driving the printing head to effect a printing operation on the basis of said readout dot-image data;
  a common bus connected at one end to said image memory means; and
  first and second switching buffer means connected between another end of said common bus and said first and second data processing means, respectively, said first and second switching buffer means being arranged to have one thereof set to a closed state to permit said image memory means to be connected to a corresponding one of said first and second data-processing means, with the other of said switching buffer means being set to an open state to prevent one of said image memory means from being connected to the other of said first and second data-processing means;
  pulse-generating means for generating pulses at regular intervals;
  latching means for, in response to a pulse from said pulse-generating means, latching the dot-image data output from said second data-processing means and supplying said dot-image data to said printing head; and
  said first and second data-processing means being responsive to the pulses from said pulse-generating means to define a period of time during which the first and second data-processing means, respectively, can access said memory means.

2. A dot-printing device according to claim 1, wherein said printing head has a plurality of head elements arranged in a direction forming a column of an acute angle with respect to a printing direction.

3. A dot-printing device according to claim 1, wherein said printing head is of an electrostatically flying type ink jet system.

4. A dot-printing device according to claim 1, further comprising paper-feeding means which is controlled by said second data-processing means.

5. A dot-printing device according to claim 1, wherein said printing head has a plurality of head elements arranged in a column with respect to a printing direction, and wherein said second data-processing means supplies the dot-image data of one column for the respective head elements of said printing head to said latching means, on the basis of the printing data stored in said memory means, in response to a pulse from said pulse-generating means, and which further comprises counting means for counting the pulses from the pulse-generating means, and means for supplying a signal, indicative of completion of the printing of the data of one line, to said first data-processing means when it is detected that the total number of dots, in the printing direction, of the printing data which is currently printed, is substantially equal to the count of said counting means.

6. A dot-printing device according to claim 1, wherein said printing head has a plurality of head elements arranged in a column with respect to a printing direction, and which further comprises counting means for counting the pulses from said pulse-generating means, and in which said second data-processing means supplies the dot-image data of one column to said latching means, on the basis of the printing data stored in said memory means, in response to a pulse from said pulse-generating means, and said first data-processing means detects an available area in said memory means, on the basis of the count of said counting means, and writes new printing data into said available area.

* * * * *